(12) United States Patent
Zweiri et al.

(10) Patent No.: US 12,037,095 B2
(45) Date of Patent: Jul. 16, 2024

(54) HYBRID AQUATIC UNMANNED AERIAL AND SUBMERSIBLE VEHICLE

(71) Applicant: Khalifa University of Science and Technology, Abu Dhabi (AE)

(72) Inventors: Yahya Hashem Zweiri, Abu Dhabi (AE); Yahya Taha Al-Majali, Athens, OH (US)

(73) Assignee: Khalifa University of Science and Technology, Abu Dhabi (AE)

( * ) Notice: Subject to any disclaimer, the term of this patent is extended or adjusted under 35 U.S.C. 154(b) by 431 days.

(21) Appl. No.: 17/430,174

(22) PCT Filed: Feb. 10, 2020

(86) PCT No.: PCT/IB2020/051011
§ 371 (c)(1),
(2) Date: Aug. 11, 2021

(87) PCT Pub. No.: WO2020/165724
PCT Pub. Date: Aug. 20, 2020

(65) Prior Publication Data
US 2022/0097812 A1 Mar. 31, 2022

Related U.S. Application Data

(60) Provisional application No. 62/803,731, filed on Feb. 11, 2019.

(51) Int. Cl.
*B63G 8/18* (2006.01)
*B64C 15/12* (2006.01)
(Continued)

(52) U.S. Cl.
CPC ............ *B63G 8/18* (2013.01); *B64C 15/12* (2013.01); *B64C 29/0033* (2013.01);
(Continued)

(58) Field of Classification Search
CPC .... B63G 8/18; B63G 2008/004; B64C 15/12; B64C 29/0033; B64C 29/02; B64C 39/00;
(Continued)

(56) References Cited

U.S. PATENT DOCUMENTS

| 3,092,060 A | 6/1963 | Reid |
| 2016/0376000 A1* | 12/2016 | Kohstall .............. B64C 39/024 114/313 |
| 2023/0221733 A1* | 7/2023 | Anishchenko ....... B64U 30/296 244/62 |

FOREIGN PATENT DOCUMENTS

| CN | 105836124 A | 8/2016 |
| CN | 207772810 U | 8/2018 |

(Continued)

OTHER PUBLICATIONS

PCT/IB2020/051011; International Search Report and Written Opinion; dated Jun. 25, 2020; 9 pages.

*Primary Examiner* — Andrew Polay
(74) *Attorney, Agent, or Firm* — Kilpatrick Townsend & Stockton LLP

(57) ABSTRACT

The invention provides for a hybrid unmanned aerial and submersible vehicle (UASV) (100) comprising a fuselage (102), at least one wing structure (104, 106), a propulsion system (116, 118) and an empennage. The said vehicle is capable of operating in air, on water and underwater via its wing tilting mechanism wherein the transition of the vehicle between different mediums is seamless. Further, the wing structures (104, 106) are connected on either side of the fuselage (102), such that each wing (104, 106) tilts about a common lateral axis (360° of freedom), and wherein said tilting depends on the mode of operation of the UASV (100). The vehicle of the present invention further includes a propeller protection system, a landing system, control surfaces, and sensors. The present invention also discloses (Continued)

methods for operating the UASV (100) in multiple mediums.

18 Claims, 5 Drawing Sheets

(51) Int. Cl.
    *B64C 29/00*     (2006.01)
    *B64C 29/02*     (2006.01)
    *B64U 30/20*     (2023.01)
    *B63G 8/00*     (2006.01)
    *B64U 10/25*     (2023.01)
    *B64U 50/13*     (2023.01)

(52) U.S. Cl.
    CPC ........ *B64C 29/02* (2013.01); *B63G 2008/004* (2013.01); *B64U 10/25* (2023.01); *B64U 30/20* (2023.01); *B64U 50/13* (2023.01)

(58) Field of Classification Search
    CPC ....... B64C 39/024; B64C 39/02; B64U 10/25; B64U 30/20
    See application file for complete search history.

(56) References Cited

FOREIGN PATENT DOCUMENTS

| | | | | |
|---|---|---|---|---|
| CN | 108725778 A | 11/2018 | | |
| FR | 2974760 A1 | * | 11/2012 | ................ B60F 5/02 |

* cited by examiner

HYBRID AQUATIC UNMANNED AERIAL AND SUBMERSIBLE VEHICLE

FIELD OF THE INVENTION

The present invention relates to the field of aerodynamics. More particularly, the present invention relates to a hybrid Unmanned Aerial and Submersible Vehicle (UASV).

BACKGROUND OF THE INVENTION

An autonomous system is a system that can be programmed to automatically carry out specific operational missions, with a certain level of governance, under the control and guidance of a human-operator at mission level. Unmanned systems can be either autonomous or remotely operated. Depending on the specifications, some are able to perform certain tasks autonomously, such as navigation or detection. Being unmanned, they allow individuals to avoid perilous or risky situations, while accessing data or monitoring the mission from a safe location.

There is a vast array of autonomous systems available today that combine tasks such as detection, classification, sample gathering, mission preparation, surveillance, and many others. Often, autonomous systems enhance performance, reduce cost and eliminate the risks that personnel may face during specialized missions. Cross-domain autonomous vehicles have been exploited in many civilian and military purposes due to their ability in operating in Aerial and Underwater environments. Over the past several years, a confluence of recognized needs and technological advances has brought about a marked change in the perceived military value of Unmanned Aerial Vehicles UAVs. Unmanned aerial vehicles (UAVs) are well known in the art. UAVs can be fixed wing aircraft, resembling conventional human piloted airplanes, or may be rotorcraft-using propellers similar to conventional human piloted helicopters. Typical UAVs are remotely controlled by humans, although some may be semi or fully autonomous.

Further, the designs of these vehicles have been bio-inspired by fish or birds swimming locomotion. Unmanned Aerial Vehicles (UAVs) operate in the air. The different types of Unmanned Ground Vehicles (UGVs) operate on all types of terrain, for example, Unmanned Surface Vehicles (USVs) are floating systems that operate on water, and Unmanned Underwater Vehicles (UUVs) operate below the surface of both shallow and deep waters. An Autonomous system usually constitutes a mission specific solution integrating a platform, a payload, a data link and a ground segment.

Prior art has classified these vehicles into three main groups based on their manoeuvring capabilities underwater as Seaplane UAVs, Submarine-launched UAVs, and Submersible aquatic UAVs. Seaplane UAVs are hybrid vehicles that can execute autonomous missions on the water surface and in the air. Examples of vehicles that been tested on the water surface include; ACAT, RQ-15 Neptune, Sea Scout, Flying Fish, GILL24 and GULL36. Submarine-launched UAVs are carried and launched by a submarine in two ways: dry-launch and wet-launch. The dry-launch UAV can be released by the submarine through torpedo tube, while wet-launch UAV can take-off from underwater after being released from the submarine's tube. Then, the UAV can be controlled by the ground station to execute certain flight missions, and commanded to be retrieved or destructed after completing the mission plan.

Some civil and military applications require a vehicle to operate well in both aerial, on the water and underwater environments, such as mapping of remote regions, and inspection of submerse structures, for instance petroleum platforms, ship hulls, and gas/oil pipelines. Among many military applications are launch and recovery from a submarine, rapid response to investigate a threat or a region of interest, delivering payloads to divers, rapid deployment to eliminate mines, smart/self-deploying buoy sensors, ships/ports inspections, or even stealth air/underwater missions.

There have been few manned prototypes; none of them operated successfully in either the air or the water due to technical difficulties, including the compatibility of the structure in the two different mediums, the crew cabin, and the life support system. Other advantages accruing to UAVs because of being unmanned include the lack of weight, size, orientation, manoeuvre or environmental penalties, or restrictions that would otherwise be imposed by crew requirements. UAVs are required to encompass a level of awareness of other aircraft and the ability to plan and execute flight paths and manoeuvres in a complex environment.

Submersible aquatic UAVs are more advantageous than the previous two groups. In addition to their ability in flying and cruising on the water surface, they can also perform seamless navigation underwater. Within these submersible UAVs, many commercial Vertical Take-off and Landing (VTOL) multirotor drones have been proposed with Several Air/Water transition mechanisms and waterproofed by utilizing special electronics to ensure surviving submergence. Unmanned Aerial Vehicles (UAVs) and Unmanned Underwater Vehicles (UUVs) have recently been the focus of many researchers and commercial companies over the globe. The popularity of these types of vehicles will continuously increase due to their expanding availability and the cost efficiency of their production. These two kinds of vehicles were designed to perform well in their own specific environments.

A single vehicle capable of performing in aerial, on water and underwater domains has remained elusive. Among all the requirements for a vehicle to perform both under air and under underwater operations, the transition between both mediums is the challenging part. An alternative to a fixed wing vehicle is that of a single or multi-rotor vehicle. One of the advantages of multi-rotor vehicles is their VTOL (vertical take-off and landing) capability. They use dual propellers/motors in each vehicle-arm with a column gap between the top and bottom motors to facilitate seamless transition between air and water.

Within these submersible UAVs, many commercial Vertical Take-off and Landing (VTOL) multirotor drones have been proposed with Several Air/Water transition mechanisms and waterproofed by utilizing special electronics to ensure surviving submergence. Recently, a VTOL submersible drone with a tilting-wing capability was introduced. However, these drones are incapable of performing long underwater manoeuvres and locomotion. Unmanned vehicles have become increasingly popular for consumers, law enforcement, research, and other tasks. They facilitates a wide variety of applications, including, for example, hostage rescue, crash recovery, sports monitoring, environmental monitoring and Surveillance, among others. Unfortunately, the capabilities of most UAVs are limited to only a handful of manoeuvres. In particular, most UAVs are able to operate only from land or other hard surfaces.

Although some existing UAV designs are intended for operation in both air and water, a drawback with such designs is that they can be complex and/or difficult or non-intuitive to operate. Accordingly, there remains a need in the industry for an aerial and submersible vehicle that are low cost, simple to manufacture, and/or simple to operate.

SUMMARY OF THE INVENTION

Therefore, it is an object of the present invention to develop an unmanned aerial and submersible vehicle (UASV) which can operate in multiple mediums. The hybrid unmanned aerial and submersible vehicle (UASV) is capable of operating in air, on water and underwater, such that the transition between air and water is seamless. The hybrid unmanned aerial and submersible vehicle combines the technologies of the unmanned underwater vehicle (UUV) and the unmanned aerial vehicle (UAV) into a single vehicle that can fly in the air, swim/loiter on the water surface, dive and navigate under the water via the vehicle's wing tilting mechanism. With its wing tilting capability, the UASV can smoothly take off and land onto the surface of the water or any surface without the need for a runway. In addition, it provides a fast and seamless air/water transition. The UASV also combines the advantages of both the traditional fixed and rotary wings UAVs. While swimming or flying, the aerodynamic shape of the UASV body reduces the drag forces on the vehicle and increase its flying and swimming capabilities. The tilting of the wings makes the UASV capable of hovering and enhance its manoeuvrability in both domains (air and water). Further, the UASV has high-speed capabilities, endurance and range.

In an aspect of the invention, the invention provides for an unmanned fixed-wing aerial and submersible vehicle (UASV) comprising: a fuselage; a plurality of wing structures; and an actuator assembled at a tip of each of the plurality of wing structures; wherein the actuator enables tilting of each the plurality of wing structures about a common lateral axis to allow seamless transition of the unmanned aerial and submersible vehicle (UASV) between multiple operating modes. The multiple operating modes comprise an aerial mode, a floating mode and a submerged mode. The aerodynamic shape of the fuselage reduces drag forces on the unmanned aerial and submersible vehicle (UASV), thereby enabling the multiple operating modes.

In an embodiment, the fuselage of the unmanned aerial and submersible vehicle (UASV) is manufactured using materials comprising polycarbonate, carbon fibre, fiberglass or CFRP (carbon fibre reinforced plastic).

In a preferred embodiment, the plurality of wing structures comprise two wing structures. The plurality of wing structures are tilted independently or simultaneously.

In an embodiment, the plurality of wing structures are straight, elliptical, tapered or sweptback.

In an embodiment, the plurality of wing structures comprise one or more solar panels embedded on each wing skin, for recharging an electrical battery positioned within the fuselage.

In a preferred embodiment, a single propulsion system is utilized during multiple operating modes of the unmanned aerial and submersible vehicle (UASV).

In an embodiment, the unmanned aerial and submersible vehicle (UASV) further comprises a controller for controlling the multiple operating modes. The controller is a manual controller or an autonomous controller.

In another aspect the invention provides for a method of transitioning between multiple operating modes of an unmanned fixed-wing aerial and submersible vehicle (UASV), the method comprising the steps of: tilting an actuator at a particular angle, wherein the actuator is assembled at each tip of a plurality of wing structures of the unmanned fixed-wing aerial and submersible vehicle (UASV); and determining a rotation speed of a propeller positioned on each of the plurality of wing structures, depending on a current operating mode. The multiple operating modes comprise an aerial mode, a floating mode and a submerged mode.

In an embodiment, positioning the plurality of wing structures in a vertical position (90°) results in a hovering scenario of the unmanned fixed-wing aerial and submersible vehicle (UASV).

In an embodiment, positioning the plurality of wing structures in a horizontal position (0°) results in a cruising scenario of the unmanned fixed-wing aerial and submersible vehicle (UASV).

In an embodiment, tilting the plurality of wing structures at an angle of 270° results in a diving scenario of the unmanned fixed-wing aerial and submersible vehicle (UASV).

In an embodiment, the plurality of wing structures are two wing structures, wherein a first actuator is assembled at the tip of a first wing structure and a second actuator is assembled at the tip of a second wing structure.

In an embodiment, the positioning the first and second wing structures parallel to each other and tilted at +45° enables a climbing action of the unmanned fixed-wing aerial and submersible vehicle (UASV).

In an embodiment, the positioning the first and second wing structures parallel to each other and tilted at −45° enables a descending action of the unmanned fixed-wing aerial and submersible vehicle (UASV).

In an embodiment, the tilting the first actuator at +45° and the second actuator at −45° enables a roll maneuvere of the unmanned fixed-wing aerial and submersible vehicle (UASV) during a submerged mode.

In an embodiment, a flap positioned on each of the plurality of wing structures enables a roll maneuvere of the unmanned fixed-wing aerial and submersible vehicle (UASV) during an aerial mode.

In an embodiment, tilting the first and second actuators in a direction wherein an angle between the first and second actuators is 180° enables a yaw maneuvere of the unmanned fixed-wing aerial and submersible vehicle (UASV).

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The present invention discloses an unmanned aerial and submersible vehicle (UASV) and methods for operating the same in multiple mediums. In particular, the present invention discloses a hybrid unmanned aerial and submersible vehicle capable of operating in air (aerial mode), on water (floating mode) and underwater (submerged mode), such that the transition between air and water is seamless. The hybrid unmanned aerial and submersible vehicle combines technologies of the unmanned underwater vehicle (UUV) and the unmanned aerial vehicle (UAV) into a single vehicle, thus enabling the vehicle to fly in the air, swim/loiter on the water surface, dive and navigate under the water via the vehicle's wing tilting mechanism.

Considering its wing tilting capability, the UASV can smoothly take off and land onto the surface of the water or any surface without the need for a runway. In addition, it provides a fast and seamless air/water transition. The UASV also combines advantages of both the traditional fixed and rotary wings UAVs. While swimming or flying, the aerodynamic shape of the UASV body reduces the drag forces on the vehicle and increase its flying and swimming capabilities. The tilting of the wings makes the UASV capable of hovering and enhance its manoeuvrability in both domains (air and water).

The various aspects of the UASV are described in conjunction with FIGS. 1-5. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, but is provided merely for describing the general principles of the invention.

Figure 1:
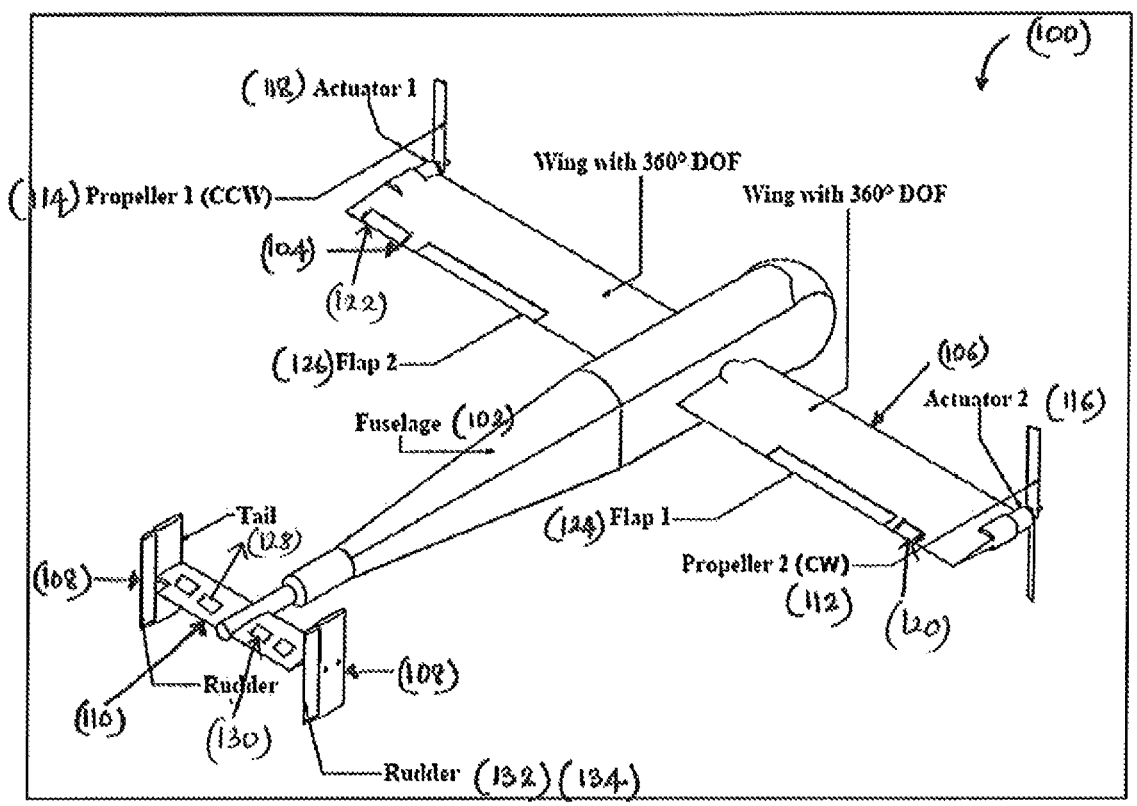
FIG. 1 illustrates a perspective view of an unmanned aerial and submersible vehicle in accordance with an embodiment of the present invention.

In an aspect of the invention, the present invention provides for a fixed wing unmanned aerial and submersible vehicle (UASV) (100) which is capable of both air and underwater operations. FIG. 1 illustrates the various components of the UASV (100). The UASV (100) comprises a fuselage (102), at least one wing structure (104, 106), an empennage, and a propulsion system. The fuselage (102) is the main body structure of the vehicle. The fuselage (102) is designed in such a way that it is suitable for both aerial and submerged operation. The fuselage (102) can be of truss type, a monocoque type or a semi-monocoque type. Preferably, the fuselage (102) is of semi-monocoque type. The fuselage (102) consists of longerons, stringers, and pressure bulkheads, which strengthen the structure of the fuselage for it to withstand impacts in addition to high pressure.

The fuselage (102) may further house numerous electrical components for controlling and operating the UASV (100) such as an electrical power source, controller or a processor, radar receiver coupled to the processor, sensors and a power distribution board. The power distribution board serves as a platform to link other electrical components in the fuselage (102). Preferably, the power source is a rechargeable battery. The battery can be selected from a lithium ion battery, a nickel cadmium battery or lithium polymer. The shape of the battery conforms to the interior profile of the fuselage (102).

The controller is used to control the aerial and submersive motion of the UASV (100). The controller further comprises of sensors such as gyro sensor, acceleration sensor, speed sensor, proximity sensor and the like. The gyro sensor senses the current attitude of the UASV (100). The fuselage (102) also comprises a radar receiver, which is coupled to the processor, which receives radio signals from ground base control panel or joystick to maneuvere the UASV (100).

In an embodiment, the fuselage (102) comprises one or more sensors. The sensors among other functions indicate whether the UASV (100) is in the air or the water. The sensors are selected from a hydro sensor, pressure sensor, and tacho sensor. The pressure sensor can further be a weight sensor or an atmospheric pressure sensor. In a preferred embodiment, the sensor is a hydro-sensor or a pressure sensor to detect if the UASV (100) is submerged in water or in air respectively. In another preferred embodiment, the sensor is a tacho sensor to determine the rotation speed of the propeller.

In another embodiment of the present invention, the fuselage (102) may additionally comprise of a video, stereoscopic or 3D camera module to capture images and videos, a global positioning system module to communicate location data to the processor and also transmit the said location data to a remote device, a self-navigation system to efficiently identify navigation paths, signage and obstacles when in operating mode, a rescue-flotation device, a laser scanner, a spectrometer, lidar, chemical analyser, refractometer among others. Additionally, the fuselage (102) may also be able to carry and transport cargo from one place to another. The fuselage (102) is made of a light-weight, durable, waterproof and a strong material that can tolerate extended exposure to water and air. Further, parts of the fuselage (102) housing the electrical components are watertight. The fuselage (102) can be made of materials like polycarbonate, carbon fibre, fibreglass, CFRP (carbon fibre reinforced plastic) and the like.

The UASV (100) comprises at least one wing (104, 106) connected to the fuselage (102). In a preferred embodiment, the UASV (100) has two wing structures (104, 106). The shape of the wings (104, 106) can be straight, elliptical, tapered, delta or sweptback. Preferably, the shape of the wings (104, 106) is rectangular or moderately sweptback. The wings (104, 106) can be constructed from a series of ribs (in the shape of the preferred airfoil), spars and wing skin. The wings (104, 106) are made of a light-weight, durable and impact resistant material such as polycarbonate, carbon fibre, fibreglass, CFRP (carbon fibre reinforced plastic) and the like. The wings (104, 106) further provides a means of mounting flight controls such as ailerons (120, 122) and flaps (124, 126) which are used to control the UASV (100) about the longitudinal axis (roll).

In a preferred embodiment, the two wing structures (104, 106) are connected on either side of the fuselage (102), wherein each wing (104 or 106) tilts about a common lateral axis (360° of freedom), and wherein the tilting of the wings (104, 106) further depends on the mode of operation (aerial, floating or submerged) of the UASV (100). The wings (104,106) of the UASV (100) can be either separately or simultaneously tilted. When the wings (104, 106) are in the horizontal position, the UASV (100) will cruise in both mediums (air and water). The control surfaces on the wings (104, 106) and empennage are used to control all small correcting movements such as pitch, roll, and yaw. After submersion to the desired depth, the wings (104,106) are tilted to achieve forward or pitch motions depending upon the angle of the wings.

Further, each of the wings (104, 106) can also include one or more solar panels comprising of at least one solar photovoltaic cell, embedded on the wing skin to recharge the electrical battery in the fuselage (102) while the UASV (100) is loitering on the water surface or flying under direct sunlight.

In an embodiment, the UASV (100) also comprises a propulsion system coupled to the wing structures (104,106) for propelling the UASV (100) in both airborne flight and underwater operation. The propulsion system is designed in a way to operate efficiently both in air and underwater. Since, the weight of the UASV (100) is significantly less in comparison to previously known submersible vehicles, owing to the use of the same propulsion system, particularly the same propellers for both aerial and underwater operations. The propulsion system includes multiple motor-driven propellers.

In a preferred embodiment of the present invention, the UASV (100) comprises two brushless DC actuators or motors (116, 118) assembled at the tips of the tilting wings (104, 106). These brushless DC actuators or motors (116, 118) drive single or coaxial propellers (112, 114) at different speeds based on a desired medium type (air or water). Selecting the direction of rotation of the propellers (112, 114) depends on the configuration which is intended to be used. The actuators or motors (116, 118) include, but are not limited to brushless motors, coreless motors or induction motors. It may be desirable to reverse the rotation direction of the motors such that the particular motor can be selected to allow efficient rotation in two directions. Additionally since the rotation rate of the propeller will vary significantly between aerial (high rate of rotation and low torque) and underwater operation (low rate of rotation and high torque), the actuators or motors are selected to provide a wide range or rotation speeds and torque.

The empennage of the UASV comprises of at least one vertical stabilizer (108) and a horizontal stabilizer (110). The stabilizers (108, 110) can be a T-tail stabilizer, inverted T-tail stabilizer or an H-tail stabilizer. The stabilizers (108, 110) provides longitudinal and directional stability to prevent the UASV (100) from unintended yaw or pitch movement. The stabilizers (108,110) further provide a means for mounting two of the primary flight controls of the UASV, which are the rudders (132, 134) and the elevators (128, 130). The rudders (132,134) provides control over the yawing movement and the elevators (128,130) provides control over the pitch movement.

The UASV further comprises of a landing gear that extends downwardly from the belly of the fuselage (102). The landing gear can be a tail-wheel type or a tricycle type landing gear, which provides a multi-point structure for landing the UASV (100) on land or any other solid surface. The landing gear can further consist of sensors such as weight sensors or hydro sensors to efficiently detect the medium on which the UASV (100) is landing.

In an embodiment, the UASV may further comprise a ballast to enhance the stability of the UASV underwater while allowing it to still be able to stay light in air. The fuselage (102) of the UASV (100) is designed to be 2-3 meters long. The wingspan of the UASV (100) is 2-5 meters long. The horizontal stabilizer span is 0.3-0.5 meters long. The weight of the UASV (100) is 15 Kg.

The wing tilting mechanism of the UASV (100) in different modes of operation is described in detail in conjunction with FIGS. 2-5. The wings (104, 106) of the UASV (100) may be tilted independently or simultaneously. When the operator directs lift, the UASV (100) moves along the Z-axis and when the operator directs yaw the UASV (100) rotates about the Z-axis. When the operator directs pitch, the UASV (100) rotates about the Y-axis and when the operator directs roll, the UASV (100) rotates about the X-axis. During take-off operations from any terrain, both the wings (104, 106) of the UASV (100) are simultaneously tilted to +90° as illustrated in FIG. 2B. This position enables the UASV (100) to hover and reach the desired altitude. During a lift (hovering) maneuvere, the UASV (100) translates along the Z-axis.

Figure 3:
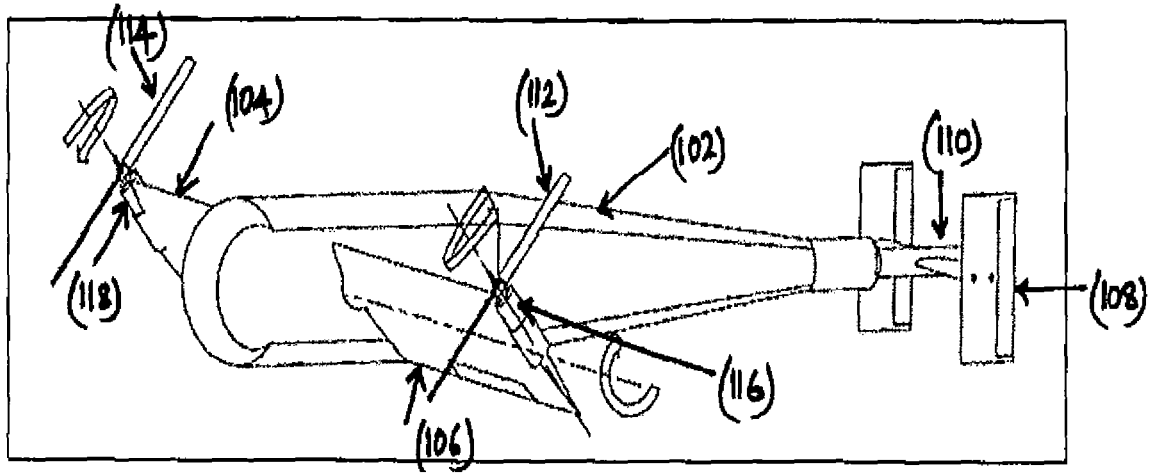
FIG. 3 illustrates the climb or descend position of an unmanned aerial and submersible vehicle in accordance with an embodiment of the present invention.
Figure 4:
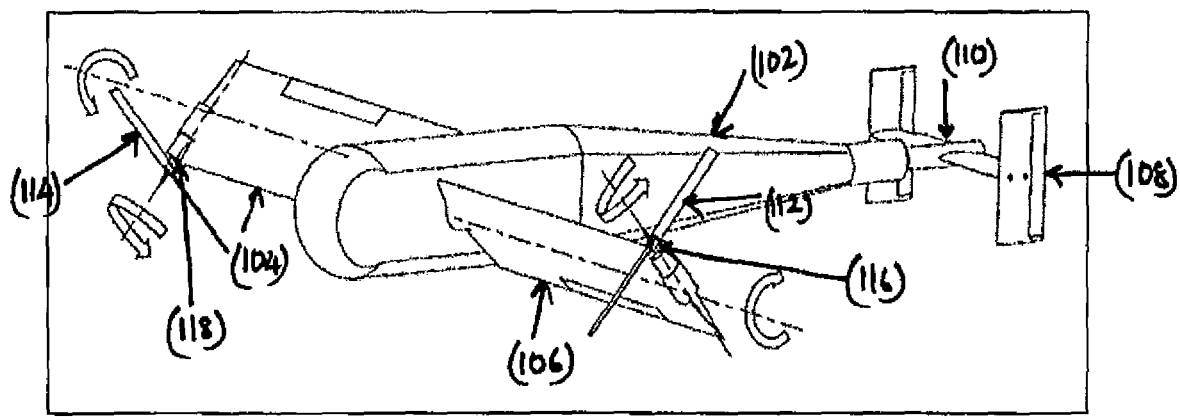
FIG. 4 illustrates the roll maneuver unmanned aerial and submersible vehicle in accordance with an embodiment of the present invention.

Upon reaching the desired altitude, to commence climb and high speed forward flight, the wings (104, 106) of the UASV (100) transition from +90° to +45° as illustrated in FIG. 3. As the desired altitude in air is reached the wings of the UASV (100) transition from a tilt of +45° to a horizontal position (0°) as illustrated in FIG. 1, thereby achieving full forward high-speed flight. At this stage, the flight controls in the UASV (100) such as the ailerons (120, 122), rudders (132, 134) and elevators (128, 130) are used to control all small correcting movements such as pitch, roll and yaw about the Y-axis, X-axis and Z-axis respectively. In this airborne mode, the UASV (100) conducts aerial ISR (Intelligence, surveillance, and reconnaissance) and/or communications while en-route to a transition point. The communications can be to/from ground-based, sea-based, aerial or satellite-based platforms.

Figure 2A:
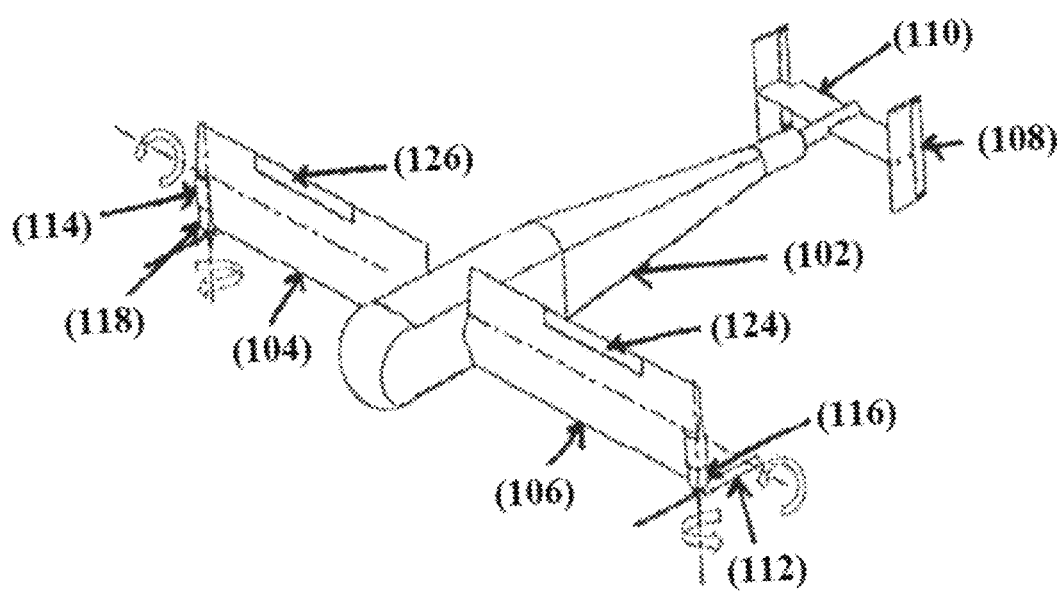
FIG. 2A illustrates a diving position of an unmanned aerial and submersible vehicle in accordance with an embodiment of the present invention.

Once the UASV (100) reaches the transition point, it starts following a decent vector until it reaches the surface of the water. As illustrated in FIG. 3, both the wings (104, 106) of the UASV (100) tilt to an angle of −45° to start the process of decent. Once close to the surface of the water the wings (104, 106) of the UASV (100) tilt to an angle of 270° so that the UASV (100) can achieve a diving maneuvere to break the surface of the water and submerge as illustrated by FIG. 2A. After the UASV (100) is fully submerged in water, the wings (104, 106) re-orient themselves to an angle of 0° so that the propellers (112, 114) can provide for a forward thrust underwater.

Figure 5:
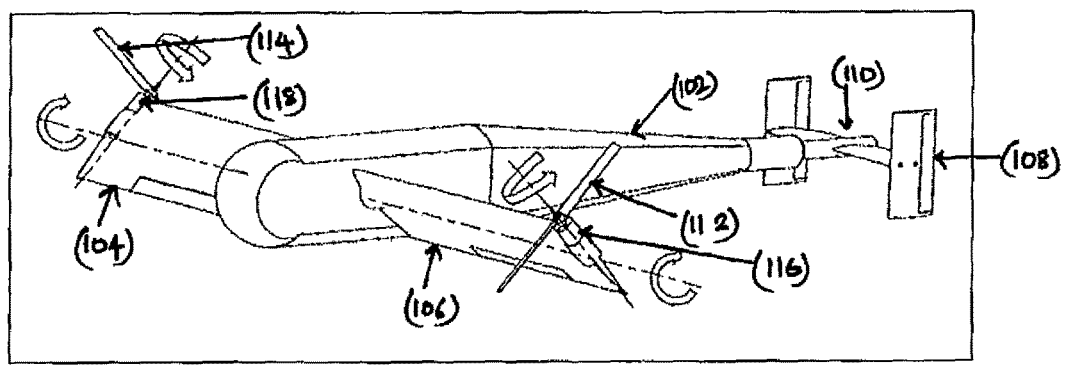
FIG. 5 illustrates the yaw maneuver unmanned aerial and submersible vehicle in accordance with an embodiment of the present invention.

Unlike aerial operations, the UASV (100) utilizes the tilting mechanism of the wings (104, 106) to achieve roll, yaw and pitch control. As can be seen from FIG. 4, to achieve a roll maneuvere, one of the wings (104) should be at +45° while the other wing (106) should be at −45°. The total angle between the both the wings (104, 106) should be 90°. When the orientation of the wings (104, 106) are in opposite directions as depicted in FIG. 5, the UASV (100) will start to yaw. The total angle between the wings (104, 106) should be 180°.

The on-board hydro sensors detect the transition from aerial to underwater operation and therefore the control of roll and yaw of the UASV (100) is switched from the conventional flight controls to the tilting mechanism of the wing. Once submerged under the water the UASV (100) can perform its mission of ISR activities. The UASV (100) may also include an underwater receiver antenna and an underwater transmitter antenna that operate at hydro acoustic frequencies. This enables the UASV (100) to receive control commands and send surveillance information to a ground, sea or aerial based control stations.

After completing its surveillance operations underwater, the operator may desire to bring the UASV (100) to the surface of the water. To achieve this, the UASV (100) acquires a climb vector underwater wherein both the wings are tilted at +45° as illustrated in FIG. 3. Upon reaching the surface of the water, due to the UASV's (100) positive or neutral buoyancy, the UASV (100) can swim/loiter on the surface. This provides for additional surveillance capabilities on the surface of the water. When the UASV (100) is swimming/loitering on the surface of the water, the solar panels on top of the wing surface can be used to charge the battery for extended operation of the UASV (100). From this position, the operator may choose to hover the UASV (100) from the surface of the water into the air for aerial operations or dive back into the water.

Figure 2B:
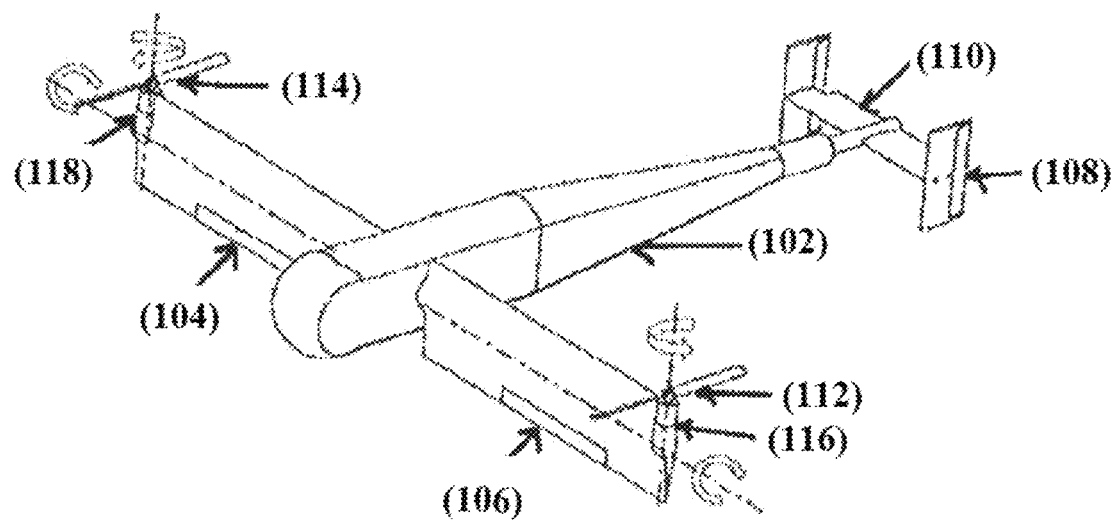
FIG. 2B illustrates a hovering position of an unmanned aerial and submersible vehicle in accordance with an embodiment of the present invention.

As illustrated in FIG. 2B, when both the wings (104,106) tilt to an angle of 90°, the UASV (100) starts a vertical take-off maneuvere from the surface of the water into the air. Once the UASV (100) reaches the desired altitude, the wings (104, 106) tilt to a full forward flight position of 0° as shown in FIG. 1. In this mode, the roll, yaw and pitch attitudes of the UASV (100) are entirely controlled by the flight controls mounted on the wings (104,106) and empennage. The UASV (100) can now perform aerial ISR operations.

Once the UASV (100) has finish its surveillance mission, it tilts both of its wings (104, 106) to an angle of −45° as depicted in FIG. 3 to achieve a decent vector. After reaching a sufficiently low altitude the UASV (100) can position its wings (104, 106) to an angle of 90° as shown in FIG. 2B so that it can hover over land. Due to the use of variable speed motors, the speed of the propellers (112, 114) can be reduced in the hovering position to slowly and smoothly land on the surface of any terrain without the need of a runway.

In an embodiment, the UASV (100) may be controlled using a manual controller or can have autonomous operation capability. The manual controller can include one or more sticks, joysticks, or knobs. The first stick is manipulated to control lift via forward and aft movements, and yaw via left and right movements. The second stick is used to control pitch via forward and aft movements, and roll via left and right movements. The instructions received from the sticks are processed by a processor that directs the instructions to a radio received for communication to the UASV (100) via a transmitter antenna. This information can also be processed by the processor and be presented on a display, which can also present other information from the UASV (100), the processor and/or other sources. A battery or other power source supplies power for the operation of the user controller.

In accordance with the present invention, the UASV (100) is used to operate autonomously to obtain intelligence, conduct surveillance and perform reconnaissance missions without direct supervisory control. The autonomous vehicle may be configured to sense environmental conditions, navigate without human input, and perform autopilot operations. The sensing of the environmental conditions may be performed via one or more of the following: a radar, a lidar, the GPS module, and a computer vision module. The processor of the UASV (100) may be operable to interpret sensory information to identify navigation paths, obstacles, and signage. The UASV (100) may be also operable to update maps based on sensory input to keep track of a position when conditions change or when uncharted environments are entered. The UASV (100) may also be pre-programed with GPS waypoints or with a route that is followed via inertial navigation.

The UASV (100) as disclosed in the present invention comprises of relatively small number of moving parts making the UASV (100) cheap and easier to manufacture and maintain. Additionally, the UASV (100) as disclosed is also simple to operate. Further, the submersible nature of the UASV (100) in addition to allowing it to perform normal operations underwater, can significantly improve the weather resistance of the UASV (100) whilst performing aerial operations.

The UASV (100) above can be used to investigate both land and underwater phenomena for scientific purposes. The UASV (100) can also be used to search for airplane crash locations over disparate ocean locations, perform ship inspections both above and below the waterline, inspect electrical transmission towers or bridges both above and below the waterline, permit research on amphibious animals, including animals traveling long distances underwater, telecommunication infrastructure inspection, and transportation, among others.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. An unmanned aerial and submersible vehicle (UASV) comprising:
   a fuselage;
   a plurality of wing structures; and
   an actuator assembled at a tip of each of the plurality of wing structures;
   wherein the actuator enables tilting of each the plurality of wing structures about a common lateral axis to allow seamless transition of the UASV between multiple operating modes, and
   wherein the plurality of wing structures comprise one or more solar panels embedded on each wing skin, for recharging an electrical battery positioned within the fuselage.

2. The UASV of claim 1, wherein the multiple operating modes comprise an aerial mode, a floating mode and a submerged mode.

3. The UASV of claim 2, wherein an aerodynamic shape of the fuselage reduces drag forces on the UASV, thereby enabling the multiple operating modes.

4. The UASV of claim 1, wherein the fuselage is manufactured using materials comprising polycarbonate, carbon fiber, fiberglass or carbon fiber reinforced plastic (CFRP).

5. The UASV of claim 1, wherein the plurality of wing structures comprise two wing structures.

6. The UASV of claim 1, wherein the plurality of wing structures are tilted independently or the plurality of wing structures are tilted simultaneously.

7. The UASV of claim 1, wherein the plurality of wing structures are straight, elliptical, tapered or sweptback.

8. The UASV of claim 1, wherein a single propulsion system is utilized during multiple operating modes of the UASV.

9. The UASV of claim 1, wherein the UASV further comprises a controller for controlling the multiple operating modes.

10. The UASV of claim 9, wherein the controller is a manual controller or an autonomous controller.

11. A method of transitioning between multiple operating modes of an unmanned aerial and submersible vehicle (UASV), the method comprising the steps of:
    tilting an actuator at a particular angle, wherein the actuator is assembled at each tip of a plurality of wing structures of the UASV; and
    determining a rotation speed of a propeller positioned on each of the plurality of wing structures, depending on a current operating mode, wherein positioning the plurality of wing structures in a vertical position) (90° results in a hovering scenario of the UASV, tilting the plurality of wing structures at an angle of 270° results in a diving scenario of the UASV, and positioning the plurality of wing structures in a horizontal position(0°) results in a cruising scenario of the UASV.

12. The method of claim 11, wherein the multiple operating modes comprise an aerial mode, a floating mode and a submerged mode.

13. The method of claim 11, wherein the plurality of wing structures are tilted independently or the plurality of wing structures are tilted simultaneously.

14. The method of claim 11, wherein the plurality of wing structures are two wing structures, wherein a first actuator is assembled at the tip of a first wing structure and a second actuator is assembled at the tip of a second wing structure.

15. A method of transitioning between multiple operating modes of an unmanned aerial and submersible vehicle (UASV), the method comprising the steps of:
    tilting first and second actuators at particular angles, wherein the first and second actuators are assembled at the tip of respective first and second wing structures of the UASV; and
    determining a rotation speed of a propeller positioned on each of the first and second wing structures, depending on a current operating mode,
    wherein at least one of:
        positioning the first and second wing structures parallel to each other and tilted at +45° enables a climbing action of the UASV, wherein positioning the first and second wing structures parallel to each other and tilted at −45° enables a descending action of the unmanned aerial and submersible vehicle, and tilting the first and second actuators in a direction wherein an angle between the first and second actuator is 180° enables a yaw maneuver of the UASV;
        tilting the first actuator at +45° and tilting the second actuator at −45° enables a roll maneuver of the UASV during a submerged mode; or
        a flap positioned on each of the first and second wing structures enables a roll maneuver of the UASV during an aerial mode.

16. The method of claim 15, wherein positioning the first and second wing structures parallel to each other and tilted at +45° enables a climbing action of the UASV, wherein positioning the first and second wing structures parallel to each other and tilted at −45° enables a descending action of the unmanned aerial and submersible vehicle, and tilting the first and second actuators in a direction wherein an angle between the first and second actuator is 180° enables a yaw maneuver of the UASV.

17. The method of claim 15, wherein tilting the first actuator at +45° and tilting the second actuator at −45° enables a roll maneuver of the UASV during a submerged mode.

18. The method of claim 15, wherein a flap positioned on each of the first and second wing structures enables a roll maneuver of the UASV during an aerial mode.

\* \* \* \* \*